Patented Dec. 8, 1931

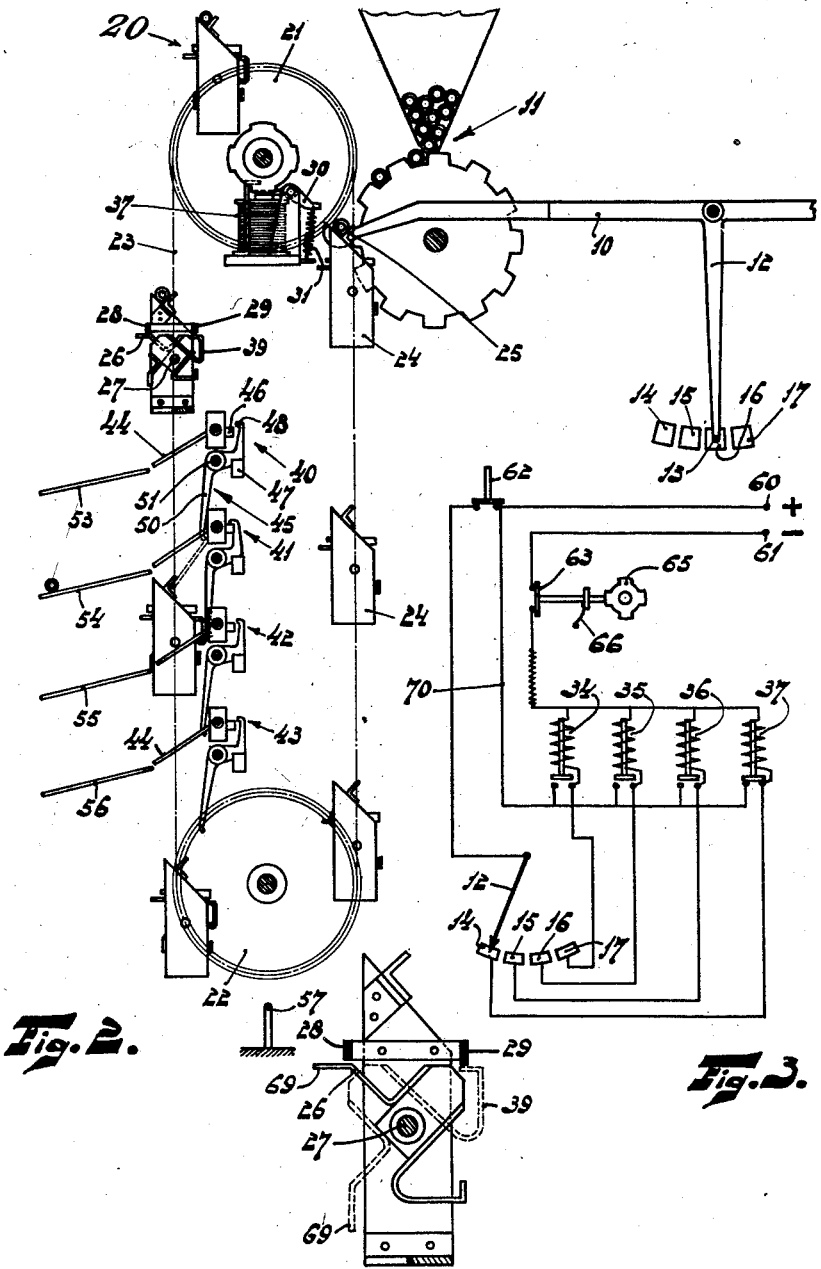

1,835,186

UNITED STATES PATENT OFFICE

PANCRAS SCHOONENBERG, OF EINDHOVEN, NETHERLANDS, ASSIGNOR TO N. V. PHILIPS' GLOEILAMPENFABRIEKEN, OF EINDHOVEN, NETHERLANDS, A LIMITED LIABILITY COMPANY OF THE NETHERLANDS

DEVICE FOR SORTING BODIES OF DIFFERENT WEIGHT

Application filed December 11, 1928, Serial No. 325,328, and in the Netherlands January 18, 1928.

This invention relates to an improvement in or modification of the invention described and claimed in specification No. 1,770,810 of July 15, 1930.

In the said specification a device for sorting articles of different weight is described. This device comprises a conveying device as well as a weighing and a sorting device which are separately arranged in the path of the said conveying device. When sorting the articles are fed one by one to the weighing device and submitted to a weighing operation whereafter by a suitable mechanism the sorting device is set according to the deflection of the weighing device. The sorting device comprises a number of sorting units one of which is brought into operation as the sorting device is set. After being weighed the article is carried on by the conveying device relatively to the series of sorting units and by one of them, namely that which is brought into operation, is lifted out of the conveying device and isolated. The sorting device is set at the moment when the loaded weighing device has come to rest. In order that the article shall be isolated by the sorting device it is indispensable that it should be caused to pass all the units before it is possible to proceed with the weighing of the next article as otherwise the next weighing operation would have the effect of actuating a second sorting unit before the first article would have passed all the sorting units. It is, of course, obvious that this method of sorting occupies a considerable amount of time and it is the object of the invention to improve the device so that the weighing operations are in quicker sequence with one another which permits of weighing a greater number of articles per time unit.

According to the invention to each of the carriers for the articles to be weighed, which carriers are disposed on the conveying device, belongs a device which is set according to the weight of the article on the carrier and which on moving relatively to the sorting units actuates one of them. As the movement of each carrier is followed by a device on which the weight of the article is so to say registered, it is possible to cause the weighing operations to be in quick sequence with one another without the risk being present that the sorting units are set erroneously as a result of the untimely weighing of a second article. In fact, before proceeding with the next weighing operation it is not necessary to wait until the carrier provided with the article to be sorted has passed all the sorting units.

According to a preferred embodiment of the invention the device moving with the carrier is provided with a number of tumble lugs each of which corresponds with one of the sorting units and a corresponding number of stationary magnets or magnet systems is arranged in the path of the conveying device so as to effect on energization the tumbling of one of the lugs according to the equilibration of the weighing device.

Weighing the article may last a very short time. When a good damping mechanism has been provided the weighing device will already have come to a standstill about one or two seconds after the article has been laid on it. Three seconds after this deposit of the article the circuit may be closed and a second later the article may be lifted out of the weighing device and carried on. It is necessary that the magnets which are required to tilt the lugs should be energized not only for this last second but also for a greater length of time so that there is a certainty as regards their being capable of effecting the tumbling.

According to a further embodiment of the invention the energization of one of the magnets has also the effect of closing a circuit which energizes the magnet or the magnet system for a given length of time independently of the further behaviour of the weighing device.

The invention will be more clearly understood by reference to the accompanying drawings which illustrate a sorting device for glass tubes or rods according to the said embodiment of the invention. In the said drawings Figure 1 is a front elevation of the sorting device according to the invention.

Figure 2 is a side elevation of the device shown in Figure 1.

Figure 3 shows diagrammatically a circuit arrangement for the energization of the magnets.

Figure 4 is a detail view of the carrier.

Figure 1:
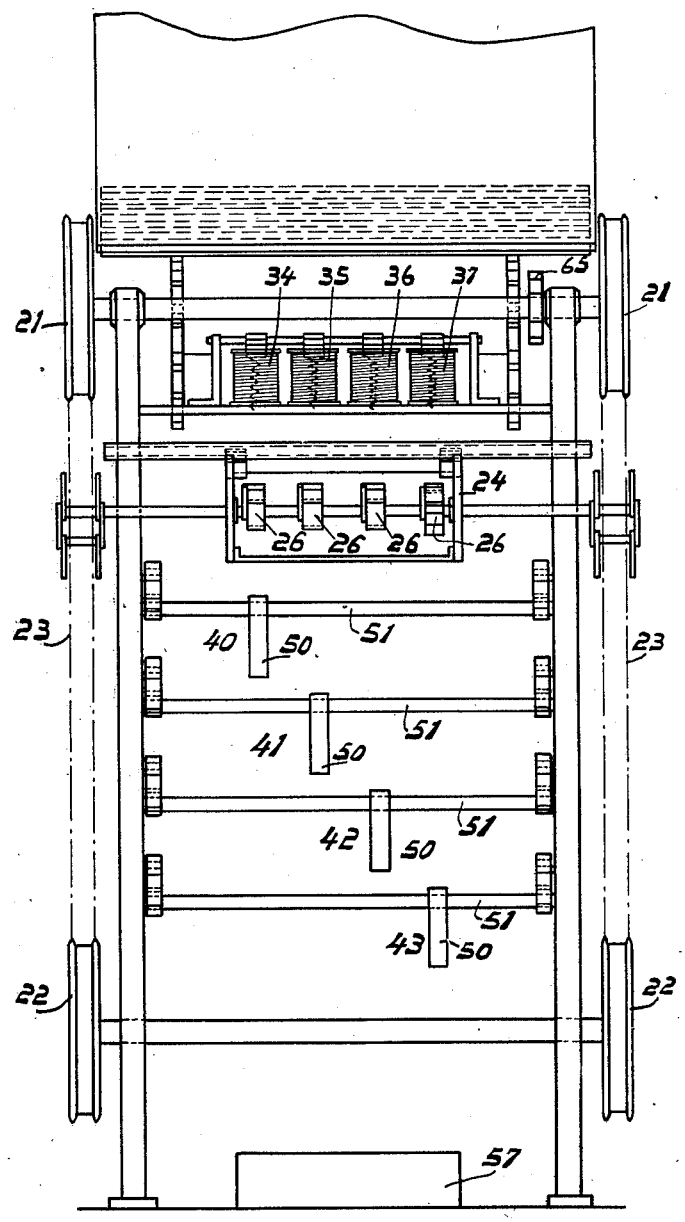

Referring to the drawings, 10 designates a lever of a weighing device to which the articles to be weighed are fed one by one by a conveying device 11. The lever 10 has secured to it a pointer 12 which moves with its end 13 relatively to contacts 14, 15, 16 and 17. A conveying device 20 comprising sprocket wheels 21 and 22 and conveying chains 23 is provided with carriers 24 which are rotatably secured in the chains 23 and which are provided with V-shaped supports 25 adapted to lodge a glass tube. In addition, the carriers are provided with a number of tumble lugs 26 (Figure 4) which are rotatable on a shaft 27 mounted in the carrier. The travel of the tumble lugs is limited by an abutment 28 and an abutment 29. In the direction of travel of the said tumble lugs projecting lugs 30 are arranged which may be energized by magnets 34—37. The lugs 30 are pulled by springs 31 into their normal position. Each of the magnets 34—37 corresponds with one of the contacts 14—17.

In the direction of travel of the carriers sorting units 40, 41, 42, 43 are arranged which essentially comprise bell-cranks 44 and 45 adapted to engage one another. The bell-crank 44 is maintained in the position shown in Figure 2 by a counterpoise 46. The bell-crank 45 occupies the position shown in Figure 2 by reason of a counterpoise 47. The bell-crank 45 is provided at one end with a lug 48 which is adapted to engage a counterpoise 46 and thus to prevent the bell-crank 44 from moving. The downwardly directed arm of the bell-crank 45 is formed in the shape of a lug 50 which for the various sorting units 40—43 occupies a different position on the shaft 51 of the bell-crank (Figure 1). The sorting units 40—43 are so arranged as to be capable of cooperating with conduits 53—56 which carry the sorted glass tubes to the sorting chamber. There is furthermore provided a cam 57 comprising a wide contact surface which is engaged by the tilted tumble lugs 26, in consequence of which the latter fall back to their initial position.

Figure 3 shows a circuit arrangement which serves for the energization of the magnets 34—37. In Figure 3 contacts 14—17 and a pointer 12 are illustrated. The magnets 34—37 comprise solenoids having a movable core. On the solenoids being energized a projecting lug 30 is brought into the path of the tumble lugs and at the same time a circuit is closed through a shunt 70, said circuit energizing the solenoid independently of the position occupied by the pointer 12. The duration of this energization is limited by a switch 63 the movement of which is controlled by a spring 66 and by a cam disc 65 which rotates with the sprocket wheels 21. A main switch 62 serves to put the aggregate out of the circuit.

The operation of the sorting device is as follows:

By the conveying device 11 glass rods or tubes are fed one by one to the lever 10 which under the weight of the tubes is given a deflection which results in a sliding movement of the pointer point 13 relatively to the contacts 14—17. After the lever 10 has come to rest in a certain position the switch 63 is closed by the disc 65 and a certain solenoid is energized. The energization of one of the solenoids has the effect of closing a circuit through the shunt 70 so that the current keeps passing through the solenoid of the magnet independently of the position occupied by the pointer 12 for example by reason of the ejection of the tube from the lever 10. The solenoid will be energized until the switch 63 is opened as a result of the movement of the cam 65.

The carriers 24 are provided at their upper end with V-shaped supports 25 in which the tube can rest. As a result of the movement of the carriers 24 the tube is ejected from the lever 10 and carried on. By reason of the weighing operation one of the magnets 34—37 is energized, in consequence of which one of the projecting lugs 30 is moved into the path of one of the tumble lugs 26 so that this latter is tilted and comes into a position which is determined by the lug 29 (the position shown in dotted lines in Figure 4). The tube is carried by the carrier relatively to the sorting units 40—43 and during this movement the plane protruding part 39 of the lug 26 engages one of the lugs 50 so that the lug 48 engages the counterpoise 46 in consequence of which the bell-crank 44 is set tightly. The counterpoise 46 is so calculated that the bell-crank 45 falls back under the weight of the tube when it has not been set tightly by a lug 48. Otherwise, the tube is lifted out of the V-shaped support and led along the guide way 53—56 to one of the sorting chambers. After depositing the tube the carriers pass the contact surface 57 which is engaged by the part 69 of the tilted tumble lug so that the latter falls back to its initial position.

The period at which the carriers 24 are allowed to pass the lever 10 is entirely controlled by the time in which the weighing device comes to rest after being loaded.

By means of suitable damping mechanisms this length of time may be reduced to minimum values so that the period in which one carrier follows the other can be reduced to 3 to 4 seconds which permits of weighing and sorting about 15 articles a minute.

What I claim is:

1. A device for sorting articles of different weight, comprising a conveying device, a weighing device and sorting units arranged in the path of said conveying device, carriers for the articles to be weighed, a plurality of tumble lugs, provided on each of said carriers, each of which lugs corresponds to one of said sorting units, a plurality of stationary magnets arranged in the path of said conveying device and actuated according to the deflection of said weighing device, said magnets being adapted to effect the tumbling of one of the lugs.

2. A device for sorting articles of different weight comprising a conveying device, a weighing device and sorting units, arranged in the path of said conveying device, at least one carrier for the articles to be weighed and a device mounted on said carrier, being adapted to be set according to the weight of the article, said carrier and said device being mounted on said conveying device, a plurality of stationary magnets arranged in the path of the conveying device and being actuated by the deflection of the weighing device, said magnets being adapted to set the device mounted on said carrier, one of said sorting units being actuated by said last mentioned device when moved relatively thereto.

3. In a device for sorting articles of different weight as claimed in claim 1, a relay adapted to keep one of said magnets energized for a given length of time, independently of the further behaviour of the weighing device.

In testimony whereof I have signed my name to this specification.

PANCRAS SCHOONENBERG.